United States Patent
Cho et al.

(10) Patent No.: US 8,692,179 B2
(45) Date of Patent: Apr. 8, 2014

(54) OPTICAL COMMUNICATION SYSTEM USING GROUNDED COPLANAR WAVEGUIDE

(75) Inventors: Wei-Han Cho, Kaohsiung (TW); Chia-Hou Tu, Tainan (TW); Shawn S. H. Hsu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 454 days.

(21) Appl. No.: 13/101,299

(22) Filed: May 5, 2011

(65) Prior Publication Data
US 2012/0039615 A1 Feb. 16, 2012

(30) Foreign Application Priority Data
Aug. 13, 2010 (TW) .................................. 99127034 A (51) Int. Cl.
*H04B 10/00* (2013.01)
*H03F 3/16* (2006.01)
*H05K 1/11* (2006.01)

(52) U.S. Cl.
USPC ........ 250/214 A; 398/116; 398/202; 174/255; 333/239; 330/308; 330/264; 330/265; 330/267

(58) Field of Classification Search
USPC ............... 250/214 A, 214 R, 227.11, 227.21; 398/115, 116, 117, 202; 174/250, 255, 174/262; 327/540, 541; 333/238, 239; 330/262, 263, 264, 265, 267, 308
See application file for complete search history.

(56) References Cited

U.S. PATENT DOCUMENTS

| | | | | |
|---|---|---|---|---|
| 5,023,951 A * | 6/1991 | Kahn | ............................ | 398/202 |
| 5,880,827 A * | 3/1999 | Heinke | ........................ | 356/224 |
| 6,163,199 A * | 12/2000 | Miske et al. | ................... | 327/434 |
| 6,771,132 B1 * | 8/2004 | Denoyer et al. | ............. | 330/308 |
| 6,778,021 B2 * | 8/2004 | Denoyer et al. | ............. | 330/308 |
| 6,828,857 B2 * | 12/2004 | Paillet et al. | ................. | 330/264 |
| 6,844,784 B1 * | 1/2005 | Denoyer et al. | ............. | 330/308 |
| 7,449,670 B2 * | 11/2008 | Yamaguchi et al. | ...... | 250/214 A |
| 7,626,476 B2 * | 12/2009 | Kim et al. | ..................... | 333/238 |
| 8,207,451 B2 * | 6/2012 | Lu et al. | ........................ | 174/262 |
| 8,346,096 B2 * | 1/2013 | Yazaki | .......................... | 398/173 |

(Continued)

FOREIGN PATENT DOCUMENTS

CN 2632940 Y 8/2004

OTHER PUBLICATIONS

Official Letter dated Oct. 23, 2013, from Taiwan Patent Office for corresponding Taiwan Patent Application No. 10221424890.

(Continued)

*Primary Examiner* — John Lee
(74) *Attorney, Agent, or Firm* — Patterson & Sheridan, LLP (57) ABSTRACT

The invention discloses an optical communication system using grounded coplanar waveguide, comprising a current buffer and a transimpedance amplifier (TIA). Transmission lines of the optical communication system have grounded coplanar waveguide (GCPW) structures. The current buffer receives a current signal from a signal source, and outputs the current signal after reducing capacitance effects of the signal source. The TIA converts the current signal to a voltage signal, wherein a first end of the TIA receives the current signal, a second end of the TIAn outputs the voltage signal, and a shunt-shunt feedback circuit is coupled between the first end and the second end. Therefore, the present invention can minimize the circuit area and lower the power consumption as well.

9 Claims, 5 Drawing Sheets

(56) References Cited

U.S. PATENT DOCUMENTS

| | | | | |
|---|---|---|---|---|
| 8,410,874 | B2* | 4/2013 | Song et al. | 333/247 |
| 2002/0066850 | A1* | 6/2002 | Wu et al. | 250/214 A |
| 2004/0113694 | A1* | 6/2004 | Paillet et al. | 330/264 |
| 2006/0007726 | A1* | 1/2006 | Khalid | 365/145 |
| 2007/0196112 | A1* | 8/2007 | Crews | 398/202 |
| 2007/0241447 | A1* | 10/2007 | Cheung et al. | 257/704 |
| 2009/0255720 | A1* | 10/2009 | Lu et al. | 174/262 |
| 2010/0102425 | A1* | 4/2010 | Ju et al. | 257/685 |
| 2010/0213584 | A1* | 8/2010 | Ju et al. | 257/660 |
| 2011/0020011 | A1* | 1/2011 | Yazaki | 398/160 |
| 2011/0084406 | A1* | 4/2011 | Choi et al. | 257/778 |
| 2011/0227675 | A1* | 9/2011 | Lutz et al. | 333/28 R |
| 2012/0032752 | A1* | 2/2012 | Song et al. | 333/33 |
| 2012/0039615 | A1* | 2/2012 | Cho et al. | 398/142 |
| 2012/0104575 | A1* | 5/2012 | Lin et al. | 257/664 |
| 2012/0281989 | A1* | 11/2012 | Dong et al. | 398/202 |

OTHER PUBLICATIONS

Chuan Do Liu, "Realization of Transimpedance Amplifier for Optical Application", May 2, 2008.

Ji-Chen Huang, "Design Techniques for 0.35mm SiGe BiCMOS High-Speed OEIC Applications", Jul. 2009.

Jun-De Jin, "Microwave CMOS Integrated Amplifiers for Wireless/Wireline Communications", National Tsing Hua University, Dec. 2008.

* cited by examiner

OPTICAL COMMUNICATION SYSTEM USING GROUNDED COPLANAR WAVEGUIDE

BACKGROUND OF THE INVENTION

1. Field of the Invention

This invention relates to an optical communication system and, more particularly, an optical communication system which includes a current buffer and a transimpedance amplifier (TIA), and uses grounded coplanar waveguide (GCPW) to be the transmission lines.

2. Description of the Prior Art

With the rapid development of Web application and the information industry, human's demand for the speed and the amount of signal transmission explode. However, because the traditional transmission medium is copper coaxial cable, the electronic signal transmission has their physical limitations. The higher the transmission speed, the more serious signal attenuation and signal distortion. Therefore, due to reduce production costs, provide better transmission quality, the optical signal with very low decay rate (<0.5 dB/km) and the characteristic of almost free from outside interference, the optical communication system with composition of the optical fiber has been widely used in all levels of the network.

The optical communication system used in data transmission between chips or in the chip becomes a topic attracted much attention in recent years. Over the past three decades continued to reduce (scale down) the CMOS integrated circuit technology into the nanometer generation stably. At the same time, the signal transmission speed cannot catch up with the rapidly rising data transmission needs in the chip or between chips when using the metal wire as the medium of electronic links. Therefore, the limitation has become one of the topics that must be addressed in the development of next generation process.

In the traditional optical communication system, the signals in the current buffer, the transimpedance amplifier (TIA) or other circuit elements are transmitted by microstrip line or coplanar waveguide (CPW). However, the transmission lines as described are not satisfactory, so there are many questions of cross coupling and substrate depletion in the signal transmission of the traditional optical communication system.

SUMMARY OF THE INVENTION

One scope of the present invention is to provide an optical communication system using grounded coplanar waveguide (GCPW), the invention uses a GCPW to be the transmission lines, therefore it is able to have a low cross coupling compared with the optical communication system using the microstrip lines, and a low substrate depletion compared with the optical communication system using coplanar waveguide (CPW).

The present invention discloses an optical communication system using grounded coplanar waveguide, comprising a current buffer and a TIA. The current buffer is coupled to a signal source, for receiving a current signal from the signal source and outputting the current signal after reducing capacitance effects of the signal source. The TIA has a first end, a second end and a shunt-shunt feedback circuit, for converting the current signal to a voltage signal, wherein the first end receives the current signal, the second end outputs the voltage signal, the shunt-shunt feedback circuit is coupled between the first end and the second end, wherein the transmission lines of the optical communication system have grounded coplanar waveguide (GCPW) structures.

According to one embodiment of the invention, the TIAn of the invention comprises a n-type metal oxide semiconductor field-effect transistor (NMOS), a p-type metal oxide semiconductor field-effect transistor (PMOS). Wherein a source of the NMOS is grounded, a gate of the NMOS is coupled to the first end, a drain of the NMOS is coupled to the second end. A source of the PMOS is coupled to a first operating voltage, a gate of the PMOS is coupled to the first end, a drain of the NMOS is coupled to the second end, the cross-voltage between the source and the gate of the NMOS is lower than the cross-voltage between the source and the gate of the PMOS. In addition, the current buffer is coupled to a second operating voltage, and the first operating voltage is higher than the second operating voltage.

According to another embodiment of the invention, the current buffer of the invention comprises a first transistor, a second transistor, a third transistor, a fourth transistor, a first resistance, a second resistance, a third resistance and a peaking circuit, wherein a drain of the first transistor is coupled to the signal source, a source of the second transistor and a source of the third transistor, a drain of the second transistor is coupled to the first resistance and the TIA, a drain of the third transistor is coupled to the second resistance and a gate of the fourth transistor, a source of the fourth transistor is grounded through the peaking circuit, and a drain of the fourth transistor is coupled to a gate of the second transistor and the third resistance. In addition, the peaking circuit is a circuit formed by a first capacitor and a fourth resistance connected in series and parallel-connected a fifth resistance, for increasing the bandwidth of the current buffer.

According to another embodiment of the invention, the structures of GCPW of the invention comprise a base, a dielectric layer, a signal line and a plurality of connectivity structures. The dielectric layer is formed on a surface of the base. The signal line is contacted with the dielectric layer. The plurality of connectivity structures is formed on the dielectric layer, and the plurality of connectivity structures are coupled to the conductive plate, and a space formed by the said plurality of connectivity structures surrounding the conductive plate, the signal line is placed in the space, and each of the connectivity structures comprises a plurality of conductive layers and at least a connectivity column, the connectivity column is contacted the conductive layer respectively, for electronically connecting the conductive layers with the conductive plate.

In summary, the invention of optical communication system using grounded coplanar waveguide is able to have a low cross coupling compared with the optical communication system using the microstrip lines, and a low substrate depletion compared with the optical communication system using CPW. Therefore, it has a faster and better signal switching, transmission and processing between the various functional blocks in optical communication systems.

On the advantages and the spirit of the invention, it can be understood further by the following invention descriptions and attached drawings.

DETAILED DESCRIPTION OF THE INVENTION

Figure 1:
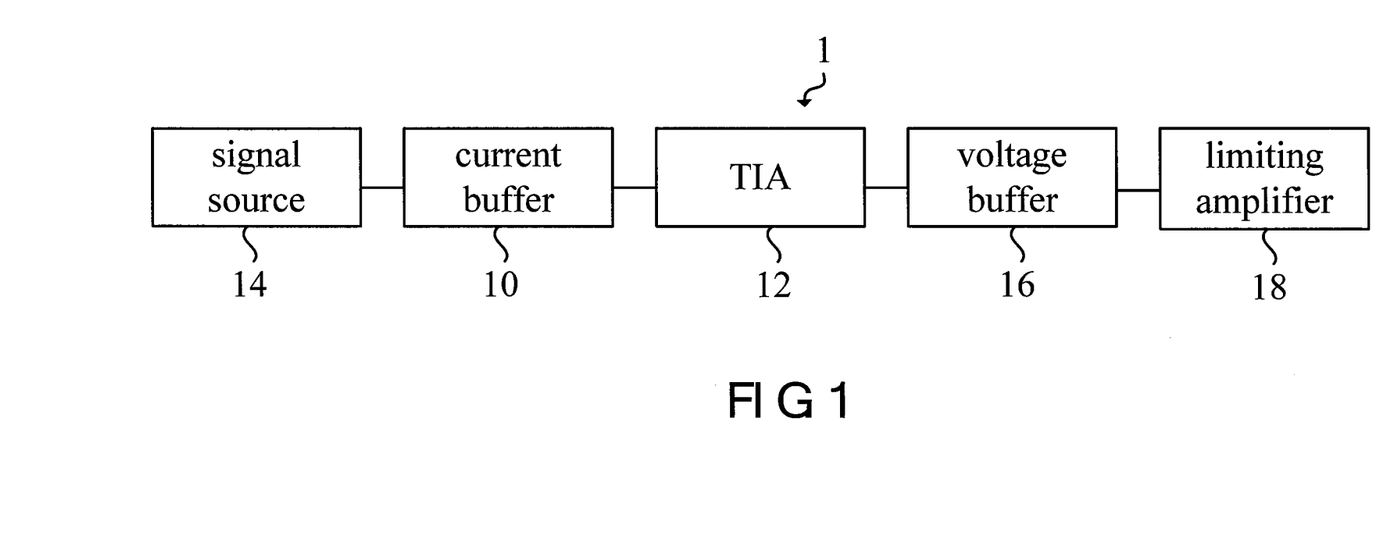
FIG. 1 is a block diagram of an optical communication system using grounded coplanar waveguide of an embodiment of the invention.

Please refer to FIG. 1. FIG. 1 is a block diagram of an optical communication system using grounded coplanar waveguide (GCPW) of an embodiment of the invention. As shown in FIG. 1, the optical communication system 1 comprises a current buffer 10 and a transimpedance amplifier (TIA) 12. Additionally, the current buffer 10 is coupled to a signal source 14, the TIA 12 is coupled to a limiting amplifier 18 via a voltage buffer 16. The signal cable utilized by the optical communication system 1 has a GCPW structure. The following are detailed description of the above components.

The current buffer 10 is used to receive current signal from the signal source 14, and outputting current signal after reducing the capacitance effect of the signal source 14. In practice, the current buffer 10 can be a RGC current buffer, as an isolation layer of the TIA 12 and the signal source 14, for reducing the influence of the large parasitic capacitance of the signal source 14 to circuit bandwidth and the influence of the noise. In other words, the current buffer 10 reduces the capacitance effect of the signal source 14. Relative to the TIA 12, the current buffer 10 is used to converting the large parasitic capacitance of the signal source 14 to a smaller parasitic capacitance.

TIA 12 has a first end, an second end and a shunt-shunt feedback circuit for converting the current signal to a voltage signal, wherein the first end receives the current signal, the second end outputs the voltage signal, the shunt-shunt feedback circuit is coupled between the first end and the second end. In practice, the amplified portion of TIA 12 converting the current to the voltage is consisted of a transistor with the shunt-shunt feedback circuit.

Figure 5:
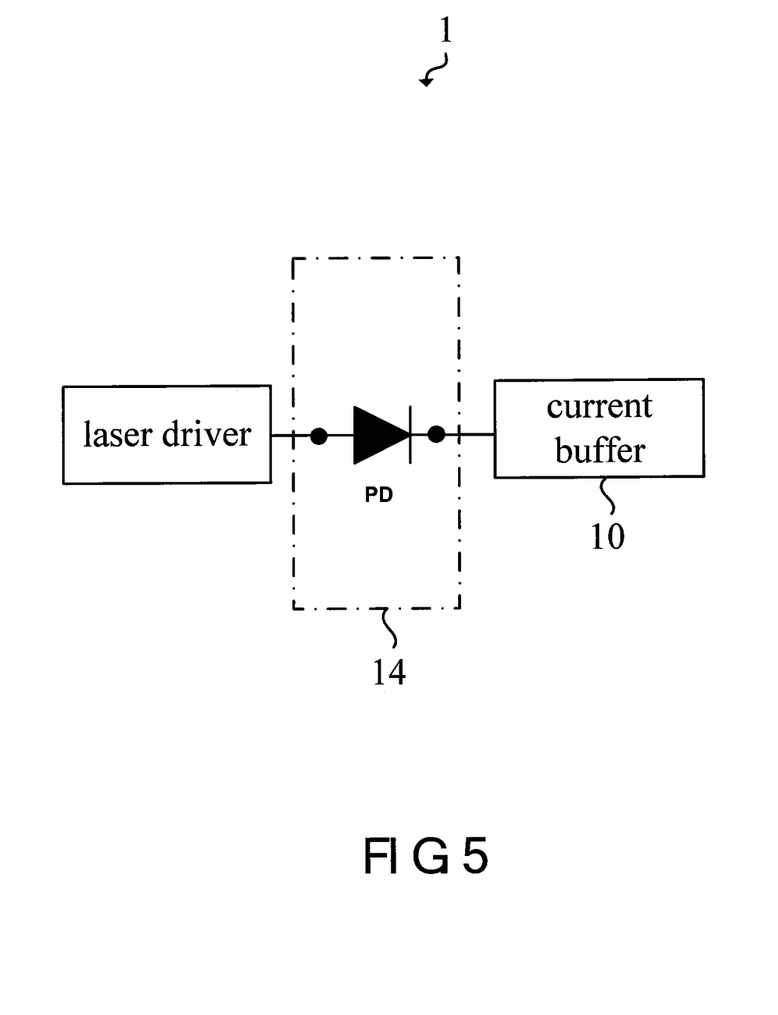
FIG. 5 is a schematic diagram of the circuit of an optical communication system using grounded coplanar waveguide of an embodiment of the invention.

Please refer to FIG. 5, FIG. 5 is a schematic diagram of the circuit of an optical communication system using grounded coplanar waveguide of an embodiment of the invention. The signal source 14 comprises a photodiode PD, wherein the signal source receives an optical signal and converts the optical signal to the current signal. In actual practice, the signal source 14 further connects a laser driver by a fiber (not shown in FIG. 1), the said laser driver comprises a laser diode for generating an optical signal. Moreover, the photodiode PD of the signal source 14 converts the optical signal to a current signal, and the signal source 14 outputs the current signal to the current buffer 10.

The voltage buffer 16 is coupled to the second end of the TIA 12, for receiving and amplifying the voltage signal. In actual practice, the main propose of the voltage buffer 16 is providing a sufficient current for driving a back-end load, but the invention is not limited to the previously described embodiment. It is worth mentioning that, in the traditional optical communication system 1, the connecting of the back-end of the TIA 12 is usually a limiting amplifier 18 or an auto-gain control, in this case it is able to cancel the voltage buffer 16, directly connect to the limiting amplifier 18, for reducing the load effects of circuit, increasing the bandwidth of the TIA 12 and improving the group delay variance.

The limiting amplifier 18 is coupled to the second end of the TIA 12 by the voltage buffer 16, for receiving and amplifying the voltage signal. In actual practice, the limiting amplifier 18 provides the amplification stage of the TIA 12, and limits the quantity of outputs. In particular, the circuit characteristics of the limiting amplifier 18 is further able to be configured by the user, such as configuring the limiting amplifier 18 to adjustable automatic gain, or adjusting the amplitude of outputs. The limiting amplifier 18 is able to be an open loop voltage amplifier in design, such as connecting a plurality of reverse amplifiers in series for providing the gain in need, or being a differential voltage amplifier for restraining the common mode noise.

However, the optical communication system 1 of the invention using grounded coplanar waveguide is capable of adjusting the TIA 12 for further reducing the power loss of the TIA 12.

Figure 2:
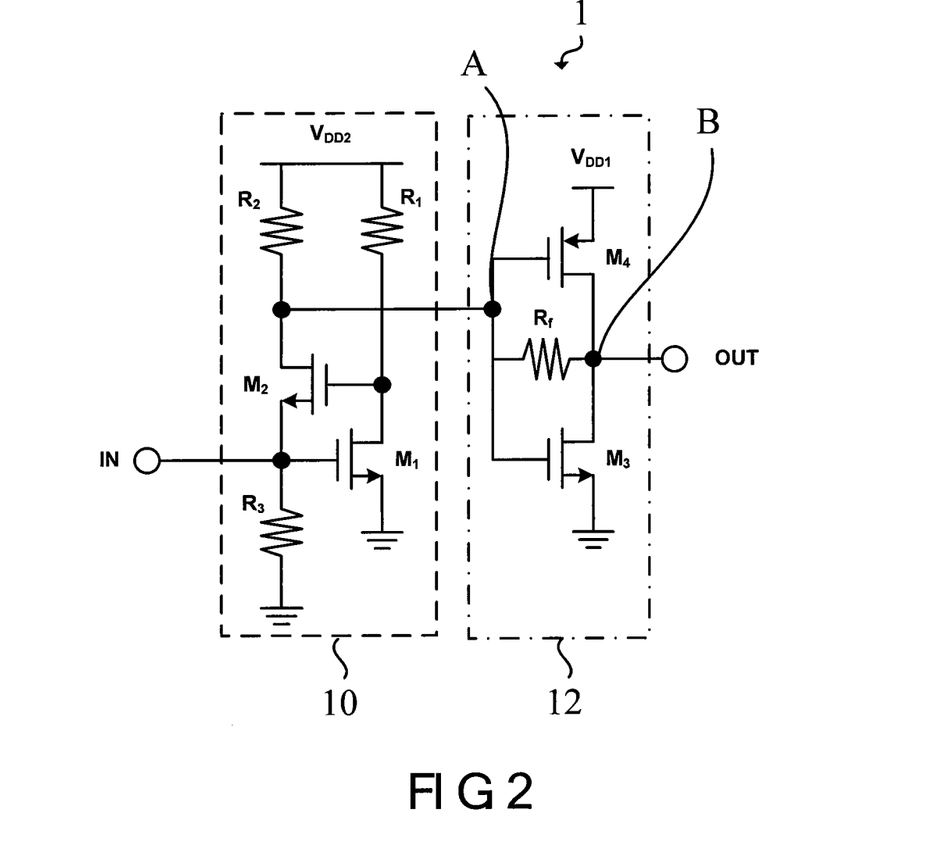
FIG. 2 is a schematic diagram of the circuit of an optical communication system using grounded coplanar waveguide of an embodiment of the invention.

Please refer to FIG. 1 and FIG. 2. FIG. 2 is a schematic diagram of the circuit of an optical communication system using grounded coplanar waveguide of an embodiment of the invention. As shown in FIG. 2, the optical communication system 1 comprises the current buffer 10 and the TIA 12. The current buffer 10 receives the current signal from the signal source 14 by the input-end, IN, and outputs to the first end of the TIA, A, after reducing the capacitance effects of the signal source 14. The TIA 12 converts the received current signal to a voltage signal, and outputs the voltage signal from the output-end, OUT, which is also the second end of the TIA 12, B.

Moreover, the TIA 12 has a n-type metal oxide semiconductor field-effect transistor (NMOS), $M_3$, as shown in FIG. 2, a p-type metal oxide semiconductor field-effect transistor (PMOS), $M_4$, as shown in FIG. 2, and a shunt-shunt feedback circuit, $R_f$, as shown in FIG. 2. The source of the NMOS is grounded, the gate of the NMOS is coupled to the first end A, the drain of the NMOS is coupled to the second end B. And, the source of the PMOS is coupled to the first operating voltage $V_{DD1}$, the gate of the PMOS is coupled to the first end A, the drain of the PMOS is coupled to the second end B.

In addition, the TIA 12 is coupled to the first operating voltage $V_{DD1}$, the current buffer 10 is coupled to the second operating voltage $V_{DD2}$. When the first operating voltage is different to the second operating voltage, the TIA 12 will become an inverter-type TIA of asymmetric bias. On the other hand, the invention is capable of making the first operating voltage higher than the second operating voltage by configured the second operating voltage down, making the cross-voltage between the source and the gate of the NMOS ($V_{GS,nmos}$) lower than the cross-voltage between the source and the gate of the PMOS ($V_{GS,pmos}$). In this way, the invention is capable of choosing the smaller PMOS for reducing the stray capacitance of circuit, and make the circuit reach the required bandwidth of 10 Gb/s in a low power loss and non-inductive peaking condition by asymmetric bias, and the current buffer 10 is capable of choosing a resistance with a higher resistance value $R_2$, for reducing the loss provided by the partial voltage between the $R_2$ and the first end of TIA 12 A.

On the other hand, the optical communication system of the invention using grounded coplanar waveguide is capable of adjusting the current buffer for reaching the requirement in the condition of low voltage operation.

Figure 3:
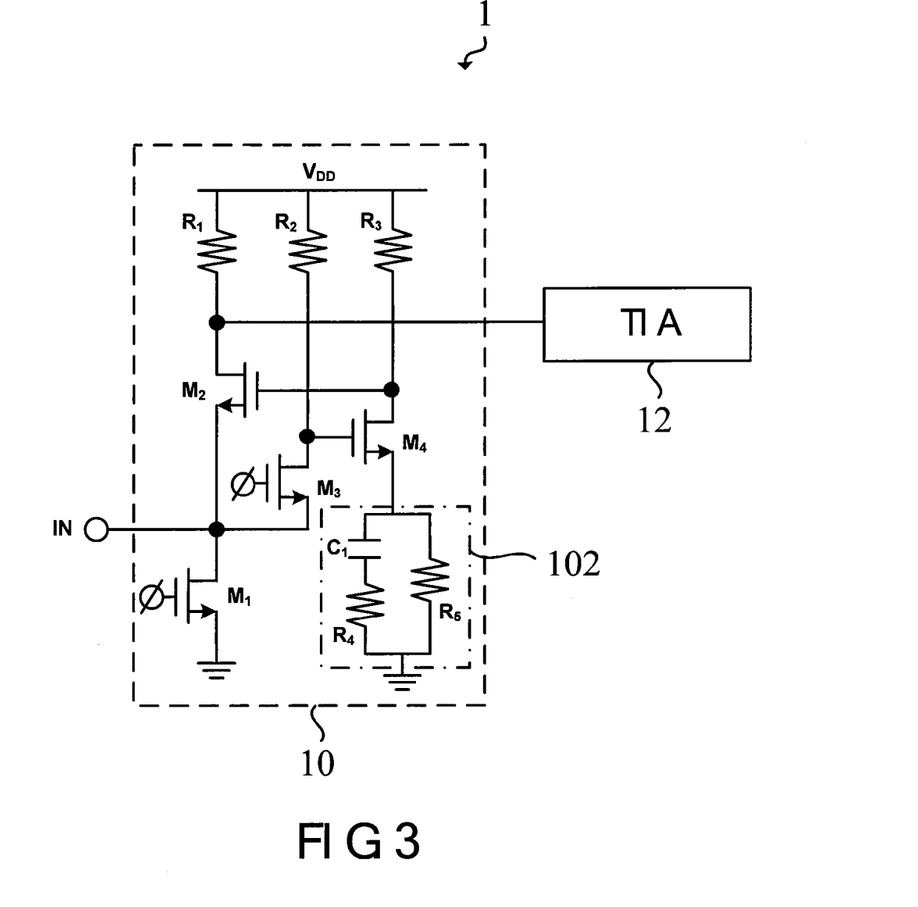
FIG. 3 is a schematic diagram of the circuit of an optical communication system using grounded coplanar waveguide of an embodiment of the invention.

Please refer to FIG. 1 and FIG. 3, FIG. 3 is a schematic diagram of the circuit of an optical communication system using grounded coplanar waveguide of an embodiment of the invention. As shown in FIG. 3, the optical communication system 1 comprises the current buffer 10 and the TIA 12. Moreover, the current buffer 10 comprises a first transistor $M_1$, a second transistor $M_2$, a third transistor $M_3$, a fourth transistor $M_4$, a first resistance $R_1$, a second resistance $R_2$, a third resistance $R_3$ and a peaking circuit 102. Moreover, the drain of the first transistor $M_1$ is coupled to the signal source 14, the source of the second transistor $M_2$ and the source of the transistor $M_3$, the drain of the second transistor $M_2$ is coupled to the first resistance $R_1$ and the TIA 12, the drain of the third transistor $M_3$ is coupled to the second resistance $R_2$ and the gate of the fourth transistor $M_4$, the source of the fourth transistor $M_4$ are grounded by peaking circuit 102, and the drain of the fourth transistor $M_4$ is coupled to the gate of the second transistor $M_2$ and the third resistance $R_3$.

In actual practice, the peaking circuit 102 is a circuit formed by a first capacitor $C_1$ and a fourth $R_4$ resistance connected in series and parallel-connected a fifth resistance $R_5$, for increasing the bandwidth of the current buffer 10, and the output-end IN is configured to connect to the source of the third transistor $M_3$, to avoid the input-end to provide the operating DC voltage to the gate of the second transistor $M_2$. Therefore, it is able to get the idea by FIG. 3, the operating voltage of the current buffer 10 $V_{DD}$ is capable of being less than the traditional current buffer structures for reaching the requirement of low voltage operation.

Figure 4:
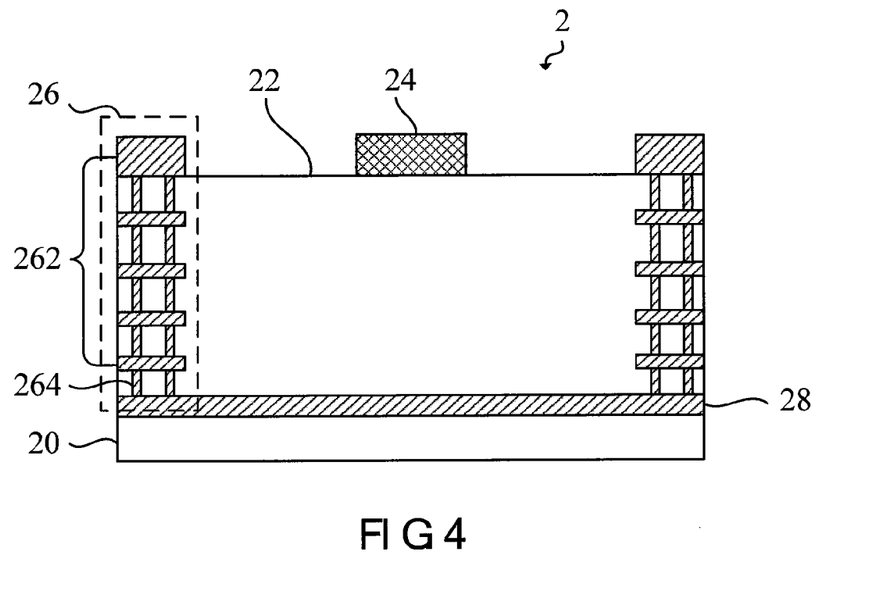
FIG. 4 is a sectional view of an optical communication system using grounded coplanar waveguide of an embodiment of the invention.

On the other hand, the transmission lines utilized in the optical communication system is GCPW structure, please refer to FIG. 4, FIG. 4 is a sectional view of an optical communication system using grounded coplanar waveguide of an embodiment of the invention. As shown in FIG. 4, the structure of GCPW 2 comprise a base 20, a dielectric layer 22, a signal line 24 and a plurality of connectivity structures 26. Moreover, the dielectric layer 22 is formed on a surface of the base 20. The signal line 24 is contacted with the dielectric layer 22. The plurality of connectivity structures 26 are formed on the dielectric layer 22, wherein the said connectivity structures 26 are coupled to a conductive plate 28.

In actual practice, a space is formed by the said plurality of connectivity structures 26 surrounding the conductive plate 28, such as the concave space shown in FIG. 4, the signal line 24 is placed in the said space. In addition, each of the connectivity structures 26 comprises a plurality of conductive layers 262 and connectivity column 264. For the purpose of increasing the conductivity, the present invention is further capable of placing the plurality of connectivity column 264 for contacting the said conductive layers 262 respectively, and for electronically connecting the conductive layers 262 and the conductive plate 28.

In this way, the structures of GCPW of the invention has a low cross coupling and a low bass loss compared with the traditional transmission lines using microstrip lines or CPW. Therefore, the optical communication system using grounded coplanar waveguide of the invention is able to be driven in a lower power and has a better transmission efficiency.

In summary, the invention of optical communication system using grounded coplanar waveguide is able to have a low cross coupling compared with the optical communication system using the microstrip lines, and a low bass loss compared with the optical communication system using CPW. Therefore, it has a faster and better signal switching, transmission and processing between the various functional blocks in optical communication systems. In addition, the present invention is able to apply to an integrated circuit in various optical communication system, such as integrating the System on Chip circuit of optical communication system for making the system in one wafer have a more and faster data processing capability.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical communication system using grounded coplanar waveguide, comprising:
   a current buffer, coupled to a signal source, for receiving a current signal from the signal source and outputting the current signal after reducing capacitance effects of the signal source; and
   a transimpedance amplifier (TIA), having a first end, a second end and a shunt-shunt feedback circuit, for converting the current signal to a voltage signal, wherein the first end receives the current signal, the second end outputs the voltage signal, the shunt-shunt feedback circuit is coupled between the first end and the second end;
   a plurality of transmission lines, connecting the current buffer and the transimpedance amplifier;
   wherein the transmission lines of the optical communication system have grounded coplanar waveguide (GCPW) structures, the current buffer further comprises a first transistor, a second transistor, a third transistor, a fourth transistor, a first resistance, a second resistance, a third resistance and a peaking circuit, wherein a drain of the first transistor is coupled to the signal source, a source of the second transistor and a source of the third transistor, a drain of the second transistor is coupled to the first end of the first resistance and the TIA, a drain of the third transistor is coupled to the second resistance and a gate of the fourth transistor, a source of the fourth transistor is grounded through the peaking circuit, and a drain of the fourth transistor is coupled to a gate of the second transistor and the third resistance.

2. The optical communication system of claim 1, wherein the TIA comprises:
   a n-type metal oxide semiconductor field-effect transistor (NMOS), wherein a source of the NMOS is grounded, a gate of the NMOS is coupled to the first end, a drain of the NMOS is coupled to the second end; and
   a p-type metal oxide semiconductor field-effect transistor (PMOS), wherein a source of the PMOS is coupled to a first operating voltage source, a gate of the PMOS is coupled to the first end, a drain of the NMOS is coupled to the second end;
   wherein the cross-voltage between the source and the gate of the NMOS is lower than the cross-voltage between the source and the gate of the PMOS.

3. The optical communication system of claim 2, wherein the current buffer is coupled to a second operating voltage, and the first operating voltage is higher than the second operating voltage.

4. The optical communication system of claim 1, wherein the peaking circuit is a circuit formed by a first capacitor and a fourth resistance connected in series and the series of the first capacitor and the fourth resistance is parallel-connected with a fifth resistance, for increasing the bandwidth of the current buffer.

5. The optical communication system of claim 1, wherein the signal source comprises a photodiode, the signal source receives an optical signal and converts the optical signal to the current signal.

6. The optical communication system of claim 1, more comprising:
   a limiting amplifier, coupled to the second end of the TIA, for receiving and outputting the voltage signal.

7. The optical communication system of claim 1, more comprising:

a voltage buffer, coupled to the second end of the TIA, for receiving and outputting the voltage signal.

8. The optical communication system of claim 1, wherein the structures of GCPW comprises:
- a base;
- a dielectric layer, formed on a surface of the base;
- a signal line, contacted with the dielectric layer; and
- a plurality of connectivity structures, formed on the dielectric layer, the connectivity structures coupled to a conductive plate, and a space formed by the connectivity structures surrounding the conductive plate, the signal line placed in the space, and each of the connectivity structures comprising:
  - a plurality of conductive layers; and
  - at least a connectivity column, contacted the conductive layer respectively, for electronically connecting the conductive layers with the conductive plate.

9. The optical communication system of claim 8, wherein the conductive plate is formed on the surface of the base.

* * * * *